April 28, 1964 N. F. D'ANTONIO 3,131,019

METHOD AND APPARATUS FOR ENHANCING THE DEVELOPMENT OF DEFORMABLE STORAGE MEDIUMS

Filed May 6, 1960

INVENTOR:
NICHOLAS F. D'ANTONIO,

BY Marvin A. Goldenberg
HIS ATTORNEY.

3,131,019
Patented Apr. 28, 1964

3,131,019

METHOD AND APPARATUS FOR ENHANCING THE DEVELOPMENT OF DEFORMABLE STORAGE MEDIUMS

Nicholas F. D'Antonio, Syracuse, N.Y., assignor to General Electric Company, a corporation of New York Filed May 6, 1960, Ser. No. 27,370
6 Claims. (Cl. 346—77)

Figure 1:
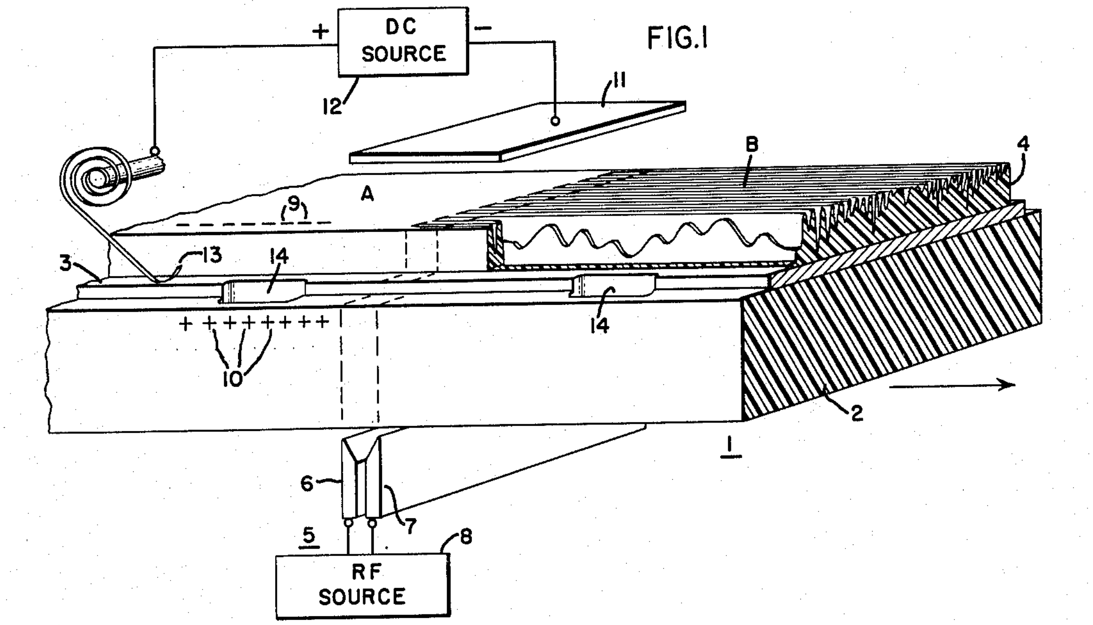

The present invention relates to the recording of information in the form of an electrical charge distribution on a deformable storage medium and more particularly to a novel method and apparatus for developing such information. More particularly this invention relates to a novel method and apparatus for enhancing the development and erasure process of thermoplastic tape in a thermoplastic recording equipment.

Thermoplastic recording is a recent development in recording techniques and provides advantages in bandwidth, tape speed, data storage, data read-out and resolution not attainable with prior art recording techniques. The recording process essentially includes the impressing of information on a thermoplastic tape in the form of a geometrical distribution of latent electrical charges. The thermoplastic tape is developed, conventionally, by the application of heat thereto, the electrostatic forces exerted by the electrical charges providing a modulated deformation of the tape. Thus, with the cooling and setting of the deformed tape, the information is permanently stored. One known method of depositing the charge distribution is by means of an electron beam from an electron gun, which is modulated by an input information signal. The beam is scanned across the thermoplastic tape and deposits the charge in the form of lines or gratings, the depth of the gratings being directly related to the amplitude of the applied information. Such technique is described in an application for U.S. Letters Patent No. 8,842, entitled "Method, Apparatus and Medium for Recording," filed February 15, 1960, by William E. Glenn and assigned to the present asignee.

In another thermoplastic recording technique, the information is applied directly in optical form, rather than by an electron beam, and the latent electrical charge distribution representing the optical information is formed on the tape surface by photoconductive means. This method is described in an application for U.S. Letters Patent No. 822,097, entitled "Method and Apparatus for Reproducing Optical Information," filed June 22, 1959, by George J. Chafaris and assigned to the present assignee.

Readout of the stored information in the thermoplastic tape is accomplished by a special form of projection system which responds to diffracted (or refracted) light that is transmitted to a readout medium through the modulated thermoplastic tape. Such a projection system is disclosed in the above referred to Chafaris application.

In developing the thermoplastic, it is necessary to apply a considerable amount of heat in order to adequately soften the thermoplastic to the extent where the electrical surface charges can readily deform the material. Thus, the facility with which the electrical charges may act upon the tape is presently dependent upon the amount of heat that is applied to the thermoplastic and to the time of the heat application. It has not been possible to supply sufficient heat to permit development at a rate necessary for many applications. It is therefore desirable to increase the rate of development presently attainable. It is also desirable to limit the heating power since the life of the tape is inversely proportional to the amount of heat applied to the tape.

Accordingly, it is an object of the present invention to provide a novel apparatus and method for improving the developing process in a recording system employing a deformable storage medium in an electrical recording system.

It is still another object of the invention to provide a novel apparatus and method for reducing the developing time of an electrical recording system employing a deformable storage medium.

It is a further object of the invention to provide a novel apparatus and method for reducing the amount of heat required for the developing and erasing processes in an electrical recording system employing a deformable storage medium.

These and other objects of the invention are achieved in an electrical recording system employing a storage medium of thermoplastic tape comprising a layer of selectively softenable transparent nonconducting thermoplastic material deformable in thickness and supported upon a transparent plastic film base layer. The thermoplastic material has deposited upon its surface a distribution of latent electrical charges having a density in accordance with an input information. The material is softened and a force normal to the surface is applied to said electrical charges by an external electric field while the material is in the softened state. The applied force causes said surface to deform in accordance with the charge density, thereby impressing the input information in the thermoplastic material.

The invention will be better understood from the following description taken in connection with the accompanying drawings while the novel and distinct features of the invention are particularly pointed out in the appended claims.

Figure 2:
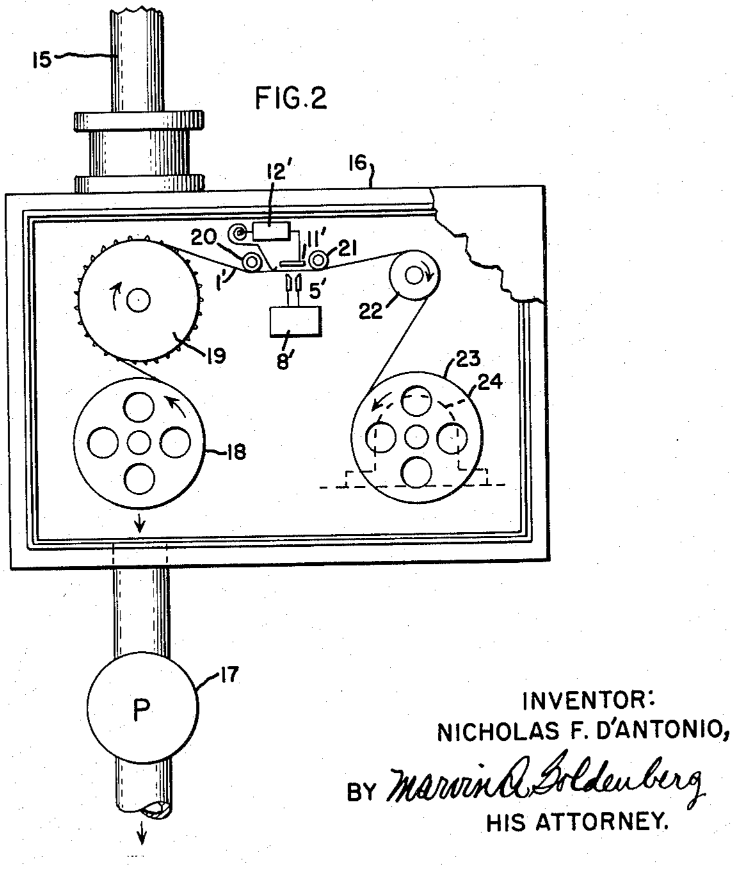

FIGURE 1 is a perspective illustration, partially sectioned, of a portion of a charged thermoplastic tape in combination with one embodiment of applicant's developing means; and FIGURE 2 illustrates one form of thermoplastic recording apparatus employing the novel developing means of FIGURE 1.

Referring now to FIGURE 1, there is illustrated a perspective view of applicant's novel developing and erasing means. The thermoplastic tape 1 to be developed appears magnified and out of proportion in thickness in the figure for purposes of illustration. It is shown as having received a line charge distribution of input information from a scanned electron beam and is undeveloped at section A and developed at section B. In the developed section B, sectional views illustrate a series of rows of troughs and crests which have been formed by the developing process from the line charges deposited by the electron beam. The portion of the tape illustrated may be considered as part of a sequence or frame of input information. It is noted that applicant's developing means has equal application when the charge distribution is formed by other means than an electron beam, e.g., a photoconductive device responsive to a direct optical input.

The tape 1 consists of three layers, the first of which is a base layer 2 of motion picture plastic film stock 1 to 3 mils in thickness, capable of withstanding a heat of development in excess of 150° C. without experiencing a change of state. Lexan, the trademark of a product of the General Electric Company, Mylar or Cronar, both trademarks of products of the E. I. du Pont de Nemours & Company, are suitable. The intermediate layer 3 is preferably of evaporated chromium which is a transparent highly conductive material, usually deposited to about a 1 micron thickness. A cuprous iodide or tin oxide, may also be used as the intermediate conducting layer. Further, this layer may be reflective, e.g., made of silver, when utilizing reflection type projection systems. The third layer is a transparent thermoplastic material 4. A polystyrene, preferably PS–2 hyperclean polystyrene, the number indicating the molecular weight, in the order of 10 microns to 1 mil thickness, is suitable for the thermoplastic layer. The melting point of the polystyrene under consideration is in the range of 100° to 150° C., although polystyrene materials having a considerably lower melting point have been observed. The melting points of the polystyrene materials are appreciably below the melting point of the plastic film stock. Openings 14 engage guide sprockets.

Heat is applied to the thermoplastic tape by means of an induction heater 5 which includes a pair of spaced apart electrodes 6 and 7, and a RF energy source 8. The electrodes 6 and 7 extend transversely across the width of the tape, spaced therefrom, and are capacitively coupled to the conducting layer 3. Thus, the RF energy generated by source 8 induces RF current in a localized portion of the conducting layer which serves to locally heat the thermoplastic layer. For the heater position indicated in FIGURE 1, the segment of the tape that is ideally heated is illustrated as enclosed by the dotted lines, although actually some heating occurs to either side of this segment. The electrodes 6 and 7 must be moved longitudinally along the tape, or the tape moved with respect to the electrodes in order to heat the thermoplastic material of an information sequence during the developing operation. In the operation of FIGURE 1, the tape 1 is moved continuously at a rapid rate in the direction indicated by the arrow and the heater electrodes 6 and 7 remain stationary. An alternative heating arrangement may comprise a radiant heater wherein a heating coil positioned alongside the thermoplastic layer is heated from a source of D.-C. potential.

When the thermoplastic material is heated to the melting region, it softens and tends to permit deformation, or development, of the thermoplastic material by the coulomb forces of attraction between the surface charges 9 and their image charges 10, which appear equally distant from the conducting layer. The surface charges exert a force on the thermoplastic material which acts against the surface tension thereof and depresses the surface in accordance with the charge density. It is noted that under intense heating, the surface tension becomes greatly reduced and the surface charges may break through and travel to the conducting layer. This phenomenon is resorted to when immediate erasure is desired, before the charges have had time to leak off. Thus, the development time, as well as the erasure time, has been found to be a function of the surface tension of the material, which is proportional to the temperature thereof, and the forces acting on the surface charges.

In accordance with one aspect of the invention, there is provided an external negatively charged electrode 11, displaced approximately 1/32 of an inch from the surface of the thermoplastic player. The electrode contributes an electric field for greatly increasing the force acting on the surface charges. The effective component of the force applied by the electric field to the surface charges is essentially in a direction normal to the surface of the thermoplastic tape. Employment of the electric field enhances the development time and reduces deleterious heating effects. Electrode 11 is in the form of a rectangular plate of highly conductive material dimensioned in length and width so as to extend slightly beyond the portion of the thermoplastic being heated. It should be positioned in proximity to the thermoplastic layer so as to apply maximum force per unit charge, but not so close as to cause arcing over. Negative charge is supplied to the electrode 11 by a D.-C. source 12, the negative terminal thereof being connected to electrode 11 and the positive terminal being connected to the conducting layer 3. Where it is desirable to have a continuously moving tape, the positive terminal of source 12 is connected to the conducting layer 3 by means of a pressure contact 13.

It is seen that the three layers of the thermoplastic tape are of successively diminishing widths. For a 35 mm. film size, the width of the conducting layer 3 is approximately 3/16 of an inch less than the width of the film stock 2, exposing 3/32 of an inch of film stock to either side of the conducting layer. Similarly, the width of the thermoplastic material 4 will be approximately 3/16 less than the width of the conducting layer 3, exposing 3/32 of an inch of conducting layer to either side of the thermoplastic layer. The pressure contact 13 is seen to ride on one of the exposed lateral portions of the conducting layer. When it is desirable to move the tape in series of steps, e.g., by a Geneva mechanism, the positive terminal from battery 11 may be successively clamped to the exposed conducting layer portion.

The principal advantage in using the external electric field is a considerably more rapid development of the tape at temperatures below those temperatures normally employed without the external electric field. It may be appreciated that the amount of heat which may be applied to the thermoplastic material is limited by the inherent characteristics of the tape and its environment. For example, when using induction heating, the application of excessive heating power will decompose the thin transparent conducting layer. In the application of radiant heat, excessive power will cause undesired heating of adjacent portions of the tape to that being acted upon. Because of such inherent limitations, the minimum development time possible by heating alone has been unsatisfactory for many applications. In addition to contributing a substantial reduction in development time, hence an increased capacity of the recording system, the external electric field reduces the heat required for both development and immediate erasure. Reduced heating contributes to a lengthening of tape life, which it is theorized results from less cross linking of the atomic structure of the tape and less agitation within the conducting layer material. It has been experimentally verified that with an electric field voltage of 600 volts more rapid development occurs than without the field where the temperature in the latter instance is 45–50° C. higher. As a further advantage of the electric field, data resolution is improved by developing at a lower temperature, the thermoplastic being more viscous, and less inclined to lateral spread during deformation. In addition, the surface charge density requirements may be reduced, making possible a finer spot size, which also improves resolution, and lowered input power requirements.

The advantages of the electric field are evidenced by the following mathematical considerations. The electrostatic force acting upon a single electron of surface charge due to the conducting layer is given by the equation:

$$F_c=\frac{e_1e_2}{4\pi K\epsilon_0r^2}$$

where $e_1$=a surface electron charge ($1.6\times10^{-19}$ coulombs)
$e_2$=the image electron charge of $e_1$
$K\epsilon_0$=the permitivity of the material between surface charges $e_1$ and image charges $e_2$
$r$=distance between $e_1$ and $e_2$ For a thickness of the thermoplastic material of .0004 inch and where $$K\epsilon_0=(2.6)\left(8.85\times10^{-14}\frac{\text{coulombs}}{\text{cm. volt}}\right)$$

the force $F_c$ acting upon the surface charge $e_1$ is equal to $20.33\times10^{-20}$ newtons per electron. In the actual case where many electrons are concentrated, this force becomes a vector summation.

In comparison, the force acting upon a single electron of surface charge under the application of an electric field is given by the equation:

$$F_{\epsilon}=e_1\epsilon_1$$

where $\epsilon_1$=the electric field intensity in the thermoplastic material

For an electric field intensity equal to $8.5\times10^6$ volts per meter, which is obtained by applying 2800 volts to an external electrode displaced $\frac{1}{32}$ of an inch from the surface of the thermoplastic material, $F_{\epsilon}=13.6\times10^{-13}$ newtons per electron. Thus, it may be seen that the force acting upon each electron is approximately $10^7$ times greater with the external electric field than without it.

Referring now to FIGURE 2, there is illustrated an electronic thermoplastic recorder employing the development means of FIGURE 1, in which information is deposited in the form of electric charges on the surface of the thermoplastic tape 1' by a modulated electron beam from a flying-spot scanner electron gun 15. The recording and developing processes take place within an evacuated chamber 16, from which the vacuum is drawn by vacuum pump 17. The thermoplastic tape is handled within chamber 16 by a tape transport mechanism comprising a feed reel 18, a sprocket wheel 19, three guide wheels 20, 21 and 22, and a take-up reel 23. The motor 24 and mechanical drive linkage (not shown, but which may be similar to that disclosed in the aforementioned Glenn application) for the transport mechanism drives these components in the respective directions shown by the arrows for continuous tape movement at a speed of approximately 15 inches per second. The development means includes, as in FIGURE 1, the RF heater 5', the external negative electrode 11' and source 12'.

In the operation of the recorder of FIGURE 2, the tape is written upon by the scanning electron beam as it passes beneth the electron gun 15. Charges are deposited on the tape surface having a charge density in accordance with the amplitude modulated signal of the electron beam. As the tape passes through the developing apparatus successive portions thereof are heated by the induction heater 5' and acted upon by an electric field from electrode 11' in a simultaneous manner. The amount of heat applied at this stage is of a prescribed quantity sufficient for permitting a rapid deformation of the tape by the surface charges when acted upon by the electric field. For the thermoplastic material under consideration, this temperature is approximately 100° C. for an electrode voltage of 600 v. This results in deforming the thermoplastic layer of the type to varying depths in accordance with the amount of charge density on the tape surface. It is noted that the volume of the thermoplastic material that is heated at any one instant is extremely localized as determined by the proximity of the electrodes of the RF heater to one another, so that as the tape moves by these electrodes, the portion of the tape to which heat is instantly applied may be thought of as a thin sliver extending transversely across the tape. The electrode 11' need be dimensioned in the transverse direction to slightly exceed the width of the tape and in the longitudinal direction to exceed that portion of the tape to which heat is being applied by the RF heater 5'. In this manner, the electrode 11' will exert a uniform force upon that portion of the tape being heated and the fringe effects of the field at the perimeter of the electrode will not be effective. As the tape passes beyond the electrodes of the RF heater, it quickly cools and the deformation is set and the information stored by the tape. After the tape is cooled, it is wound upon the take-up reel 23 and may be utilized for whatever purpose desired.

The information stored in the tape may readily be erased soon after the writing process by again passing the tape through the developing apparatus and applying heat in excess of that employed in the developing process so that the surface charges pierce the tape surface and are absorbed by the conducting layer. Alternatively, erasure may be accomplished by applying a positive charge to the external electrode 11' while passing the tape through the developing apparatus, so that the surface charges are atracted to the electrode. If the erasing process occurs considerably after the writing process, when the surface charges have leaked off, it is necessary to merely heat the thermoplastic material to a point at which it may resume its normally even contour.

The recording apparatus illustrated in FIGURE 2 is intended to be merely illustrative of an operable embodiment of applicant's novel developing apparatus. This apparatus, however, has equal application to the developing of charge information in other than a vacuum environment. For example, in the istance where a charge distribution representing input information is deposited on the thermoplastic layer directly by optical means in an air atmosphere, the developing process will likewise take place in such atmosphere. The force of the electric field will be only slightly diminished in the air atmosphere as compared to a vacuum.

In addition, the high voltage external electrode may alternatively be connected by the D.-C. source to an auxiliary electrode positioned in proximity to or adjoining the underside of the plastic film stock, in lieu of being connected to the conducting layer. Further, it other than induction heating is employed, e.g., radiant heating, the conducting layer may be omitted completely, simplifying the tape manufacture. In such instance the field is created between the high voltage electrode and the auxiliary electrode, as it would be in the first case.

Although the operation of applicant's device as described in FIGURES 1 and 2 is with reference to a distribution of negative surface charges, requiring a negatively charged external electrode 11, it should be realized that the apparatus has equal application to a distribution of positive surface charges, or positively charged ions. Positive charges may be readily deposited by a xerographic process in accordance with an information input. For this type of operation, it is apparent that a positively charged external electrode is required for applying the proper compressive forces on the charges.

While the invention has been described primarily with relation to thermoplastic recording mediums, it has application to other forms of deformable recording mediums. For example, when employing an oil film at the recording medium, wherein information writing, developing and readout occur together, a transparent electrode may be employed to apply an electric field to the surface charges, decreasing the required charge density. This allows a finer spot size of the writing beam, providing an improved resolution. In addition, a more viscous oil medium may be more readily used for applications in which it is desired to retain the impressed surface image.

The appended claims are to be construed as including all such modifications which fall within the true scope and spirit of the invention.

What I claim as new and desire to secure by Letters Patent of the United States is:

1. In an electrical recording system employing a storage medium of thermoplastic tape including a layer of thermoplastic material supported upon a base layer of nonconducting material and having a layer of conducting material intermediate said thermoplastic layer and said base layer, apparatus adapted to develop a physical surface deformation in said thermoplastic material from a latent image provided by an electrical charge distribution deposited on the surface of said thermoplastic material in accordance with an information input comprising: means for temporarily heating said thermoplastic material to a softened condition, a planar electrode positioned parallel and in proximity to said surface, voltage supply means coupled between said electrode and said conducting layer for creating a uniform electric field at said surface for applying a compressive force to said electrical charges in a direction normal to said surface during the period that said thermoplastic material is in its softened condition whereby the thermoplastic material is rapidly deformed in accordance with said electrical charge distribution.

2. Apparatus as in claim 1 wherein said means for heating is an induction type heater positioned adjacent to said thermoplastic tape which induces radio frequency currents within said conducting layer for successively heating localized portions of said thermoplastic material and wherein said electric field exerts a force on at least those electrical charges within said portions.

3. In an electrical recording system, apparatus adapted to record a physical surface deformation in a nonconducting deformable recording medium comprising: means for applying to the surface of said recording medium a layer of patterned electrical charge having a distribution in accordance with an information input, and nonemissive electrostatically charged electrode means positioned in spaced proximity with and extending over the charged surface for applying an electric field through said charged surface for exerting a force on said charge in a direction approximately normal to said surface whereby said recording medium is rapidly deformed in accordance with the electrical charge distribution.

4. In an electrical recording system, apparatus adapted to record a physical surface deformation in a nonconducting deformable recording medium comprising: means for applying to the surface of said recording medium a layer of patterned electrical charge having a distribution in accordance with an information input, means for heating said recording medium to a softened condition, and nonemissive electrostatically charged electrode means positioned in spaced proximity with and extending over the charged surface for applying an electric field through said charged surface for exerting a force on said charge in a direction approximately normal to said surface whereby said recording medium is rapidly deformed in accordance with the electrical charge distribution.

5. In an electrical recording system, apparatus adapted to record a physical surface deformation in a thermoplastic material comprising: means for applying to the surface of said thermoplastic material a layer of patterned electrical charge having a distribution in accordance with an information input, means for heating said thermoplastic material to a softened condition, and nonemissive electrostatically charged electrode means positioned in spaced proximity with and extending over the charged surface for applying a uniform electric field through said charged surface for exerting a force on said charge in a direction approximately normal to said surface during the period that said material is in its softened condition whereby the material is rapidly deformed in accordance with the electrical charge distribution.

6. In an electrical recording system employing as the recording medium a deformable thermoplastic material, apparatus adapted to erase a physical surface deformation of said material that is accompanied by a residual electrical charge present on the surface and conforming to said surface deformation, said apparatus comprising: means for heating said thermoplastic material to a softened condition, a nonemissive electrostatically charged electrode positioned in spaced proximity to said surface, and means for uniformly charging said electrode for applying an electric field through the charged surface so as to exert a force on said residual electrical charge during the period that said material is in its softened condition for driving said residual charge from said surface whereby the recording medium assumes a normally even surface contour.

References Cited in the file of this patent

UNITED STATES PATENTS

| | | |
|---|---|---|
| 1,891,780 | Rutherford | Dec. 20, 1932 |
| 2,391,450 | Fischer | Dec. 25, 1945 |
| 2,391,451 | Fischer | Dec. 25, 1945 |
| 2,616,961 | Groak | Nov. 4, 1952 |
| 2,698,928 | Pulvari | Jan. 5, 1955 |
| 2,884,348 | Kulesza | Apr. 28, 1959 |
| 2,985,866 | Norton | May 23, 1961 |

FOREIGN PATENTS

| | | |
|---|---|---|
| 384,258 | Great Britain | Feb. 4, 1931 |
| 784,450 | Great Britain | Oct. 9, 1957 |